(12) United States Patent
Zhang et al.

(10) Patent No.: US 9,880,659 B2
(45) Date of Patent: Jan. 30, 2018

(54) TOUCH CONTROL DISPLAY PANEL AND MANUFACTURING METHOD THEREOF, DISPLAY DEVICE

(71) Applicant: Boe Technology Group Co., Ltd., Beijing (CN)

(72) Inventors: Feng Zhang, Beijing (CN); Zhanfeng Cao, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/122,880

(22) PCT Filed: Aug. 20, 2015

(86) PCT No.: PCT/CN2015/087609
§ 371 (c)(1),
(2) Date: Aug. 31, 2016

(87) PCT Pub. No.: WO2016/165255
PCT Pub. Date: Oct. 20, 2016

(65) Prior Publication Data
US 2017/0075470 A1    Mar. 16, 2017

(30) Foreign Application Priority Data

Apr. 17, 2015  (CN) .......................... 2015 1 0184956

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0416; G06F 3/0412; G06F 3/044; G06F 2203/04108; G02F 1/1333; G02F 1/1343
See application file for complete search history.

(56) References Cited

U.S. PATENT DOCUMENTS

2010/0136868 A1    6/2010   Chien et al.

FOREIGN PATENT DOCUMENTS

| CN | 1892344 | 1/2007 |
|---|---|---|
| CN | 103123548 | 5/2013 |

(Continued)

OTHER PUBLICATIONS

International Search Report and Written Opinion from PCT/CN15/087609 dated Jan. 19, 2016.
(Continued)

*Primary Examiner* — Charles Hicks
(74) *Attorney, Agent, or Firm* — Calfee, Halter & Griswold LLP

(57) ABSTRACT

The touch control display panel comprises an array substrate and an alignment substrate arranged in alignment with the array substrate. The alignment substrate comprises a black matrix arranged on a first substrate. The black matrix protrudes from the first substrate, and the orthographic projection of a side of the black matrix away from the first substrate on the first substrate covers an orthographic projection of a side of the black matrix close to the first substrate on the first substrate. The first substrate is further provided with a plurality of touch control electrode groups formed using the black matrix as a mask plate. The present invention can effectively reduce the number of mask plates and the process steps as well as the production cost, which can
(Continued)

further reduce the thickness of the touch control display panel and facilitates the manufacture of light and thin products.

20 Claims, 4 Drawing Sheets

(51) Int. Cl.
    *G02F 1/1333*     (2006.01)
    *G02F 1/1343*     (2006.01)

(52) U.S. Cl.
    CPC .......... *G02F 1/1333* (2013.01); *G02F 1/1343* (2013.01); *G06F 2203/04103* (2013.01)

(56) References Cited

FOREIGN PATENT DOCUMENTS

| | | |
|---|---|---|
| CN | 103885637 | 6/2014 |
| CN | 203706176 | 7/2014 |
| CN | 104199578 | 12/2014 |
| CN | 104731437 | 6/2015 |

OTHER PUBLICATIONS

Office action from Chinese Application No. 201510184956.6 dated Mar. 27, 2017.

A-A'

TOUCH CONTROL DISPLAY PANEL AND MANUFACTURING METHOD THEREOF, DISPLAY DEVICE

RELATED APPLICATIONS

The present application is the U.S. national phase entry of PCT/CN2015/087609, with an international filing date of Aug. 20, 2015, which claims the benefit of Chinese Patent Application No. 201510184956.6, filed on Apr. 17, 2015, the entire disclosures of which are incorporated herein by reference.

FIELD OF THE INVENTION

The present invention relates to the field of display technologies and particularly to a touch control display panel and manufacturing method thereof, and a display device.

BACKGROUND OF THE INVENTION

The display devices such as liquid crystal display device (LCD) and organic electroluminescent device (OLED) have become necessities in people's life and are gradually changing people's life. The existing LCD display device is formed by adhering an array substrate and a color filter substrate together by alignment process. Upon alignment, there would be certain deviation between the array substrate and the color filter substrate, which would cause the problems such as decrease in the aperture ratio and light leakage in the LCD display device. The higher the resolution of the LCD device is, the more serious the decrease in the aperture ratio is. Meanwhile, the brightness, color gamut etc. of the product would decrease while energy consumption would increase.

On the other hand, as science and technology develop, human-machine interaction technology is more and more widely applied in people's daily life, e.g. display devices such as mobile phone and tablet computer that possess touch control function, and so on. However, for the touch screen manufacturers, the cost embodies their competitive powers. Therefore, the touch screen manufacturers are most concerned about how to simplify the manufacture process of the touch screen, reduce the cost thereof and improve the yield rate.

In order to improve the deviation in alignment between the array substrate and the color filter substrate and increase the aperture ratio, the panel manufacturers have developed a technology of manufacturing a color filter on the array substrate. As shown in FIGS. 1 and 2, the array substrate is provided with a thin film transistor array 21 and a color filter layer 22, the alignment substrate is provided with a black matrix 11, and a spacer 3 is provided between the array substrate and the alignment substrate. Moreover, in the prior art the touch control panel 4 is usually attached to the display panel by way of adhesion to enable the touch control function (as shown in FIG. 2), which leads to a complicated structure and high cost and does not conform to the development trend of making the display product light and thin.

SUMMARY OF THE INVENTION

It is an object of the present invention to provide a touch control display panel and manufacturing method thereof and a display device so as to simplify the process steps, reduce the production cost and achieve light and thin products.

To solve the above technical problem, as a first aspect of the present invention a touch control display panel comprises an array substrate and an alignment substrate arranged in alignment with the array substrate. The alignment substrate comprises a black matrix arranged on a first substrate. The black matrix protrudes from the first substrate, and an orthographic projection of a side of the black matrix away from the first substrate on the first substrate covers an orthographic projection of a side of the black matrix close to the first substrate on the first substrate. The first substrate is further provided with a plurality of touch control electrode groups formed by deposition using the black matrix as a mask plate, each of the touch control electrode groups comprising two or more touch control electrodes.

In some exemplary embodiments, the area of an orthographic projection of a side of the black matrix away from the first substrate on the first substrate is larger than the area of an orthographic projection of a side of the black matrix close to the first substrate on the first substrate.

In some exemplary embodiments, a section of the black matrix in a direction perpendicular to the first substrate is of a trapezoid shape, and the shorter bottom side of the trapezoid is close to the first substrate.

In some exemplary embodiments, adjacent touch control electrode groups, and multiple touch control electrodes in each of the touch control electrode groups are all separated by the black matrix.

In some exemplary embodiments, the black matrix comprises a surrounding portion arranged to surround the touch control electrode group, and a separating portion for separating the multiple touch control electrodes in the touch control electrode group.

In some exemplary embodiments, the separating portion extends in a stepped shape along edges of pixel units of the touch control display panel.

In some exemplary embodiments, the array substrate comprises a thin film transistor array and a color filter layer arranged successively on a second substrate.

In some exemplary embodiments, a spacer is further provided between the array substrate and the alignment substrate, and the spacer and the black matrix are formed simultaneously using the same process.

In some exemplary embodiments, the alignment substrate is further provided with an alignment marker, and the alignment marker, the spacer and the black matrix are formed simultaneously using the same process.

As a second aspect of the present invention, a display device comprises the above touch control display panel provided by the present invention.

As a third aspect of the present invention, there is further provided a manufacturing method of a touch control display panel. The touch control display panel comprises an array substrate and an alignment substrate arranged in alignment with the array substrate. The manufacturing method comprises manufacturing an alignment substrate by providing a first substrate; forming a black matrix on the first substrate, the black matrix protruding from the first substrate, an orthographic projection of a side of the black matrix away from the first substrate on the first substrate covering an orthographic projection of a side of the black matrix close to the first substrate on the first substrate. In certain embodiments on the substrate where the above steps have been carried out, a touch control electrode layer is deposited using the black matrix as a mask plate, the touch control electrode layer being broken off at positions corresponding to the black matrix to form a plurality of touch control electrode groups, each touch control electrode group comprising multiple touch control electrodes.

In some exemplary embodiments, the area of an orthographic projection of a side of the black matrix away from the first substrate on the first substrate is larger than the area of an orthographic projection of a side of the black matrix close to the first substrate on the first substrate.

In some exemplary embodiments, a section of the black matrix in a direction perpendicular to the first substrate is of a trapezoid shape, and the shorter bottom side of the trapezoid is close to the first substrate.

In some exemplary embodiments, the step of forming a black matrix comprises forming a black resin material layer on the first substrate; exposing, drying and developing the black resin material layer using a halftone mask plate to form the black matrix.

In some exemplary embodiments, the manufacturing method further comprises manufacturing an array substrate, by providing a second substrate; forming on the second substrate a thin film transistor array and a color filter layer successively; and performing alignment between the array substrate and the alignment substrate to obtain the touch control display panel.

In some exemplary embodiments, the manufacturing method further comprises forming a spacer on the first substrate, wherein the spacer is formed simultaneously using the step of forming the black matrix.

In some exemplary embodiments, the manufacturing method further comprises forming an alignment marker on the first substrate, wherein the alignment marker is formed simultaneously using the step of forming the black matrix.

The present invention integrates the touch control electrodes that realize touch function into the interior of the touch control display panel, and employs the black matrix as the mask plate at the time of manufacturing the touch control electrodes. The present invention can not only reduce the number of mask plates and the process steps as well as the cost, but also reduce the thickness of the touch control display panel, which facilitates the manufacture of light and thin products and improves the additional value and competitive power of the products.

BRIEF DESCRIPTION OF THE DRAWINGS

The drawings are used to provide further understanding of the present invention and constitute a part of the description, which are used for illustrating the present invention together with specific embodiments below rather than limiting the present invention.

Figure 1:
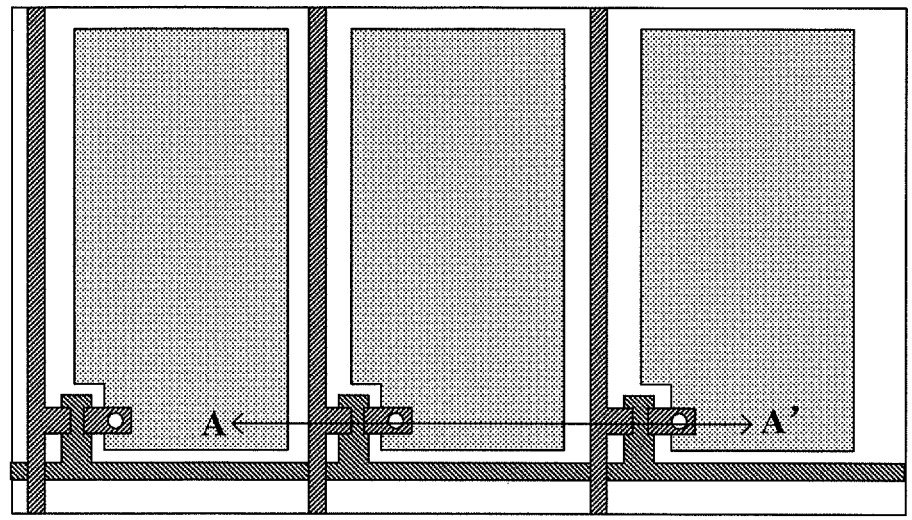
FIG. 1 is a top view of a touch control display panel in the prior art.
Figure 2:
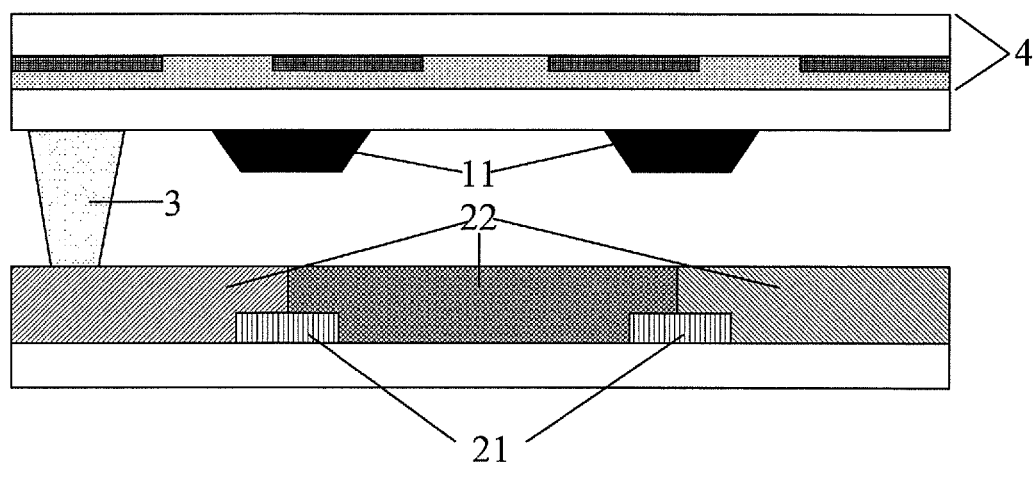
FIG. 2 is a sectional view of FIG. 1 in the A-A' direction.

In the drawings, 10—first substrate; 11—black matrix; 11a—surrounding portion; 11b—separating portion; 12—touch control electrode; 20—second substrate; 21—thin film transistor array; 22—color filter layer; 3—spacer; 4—touch control panel; 5—pixel unit; 6—black resin material layer; 7—halftone mask plate.

DETAILED DESCRIPTION OF THE INVENTION

Specific embodiments of the present invention are set forth below in detail with reference to the drawings. It should be understood that specific embodiments described here are only used for illustrating and interpreting the present invention, rather than limiting the present invention.

Figure 3:
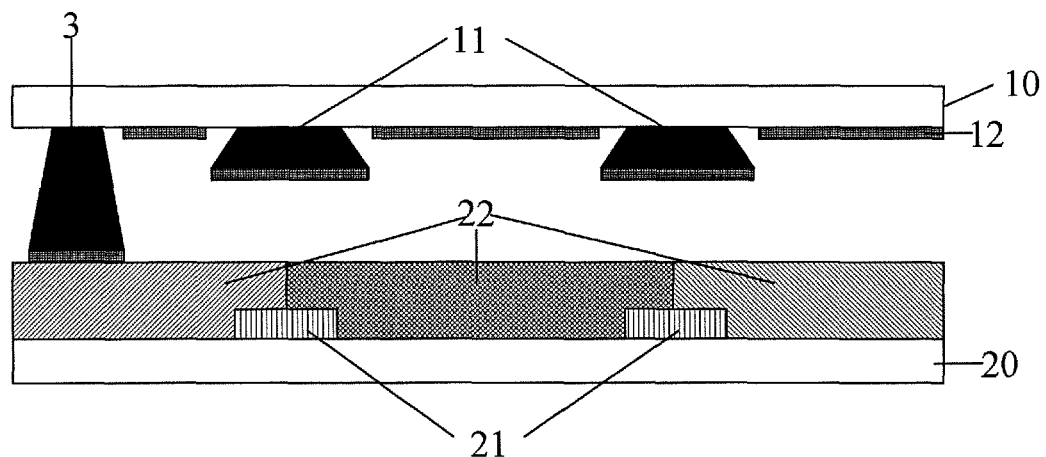
FIG. 3 is a schematic view of a touch control display panel in embodiments of the present invention.
Figures 4A, 4B:
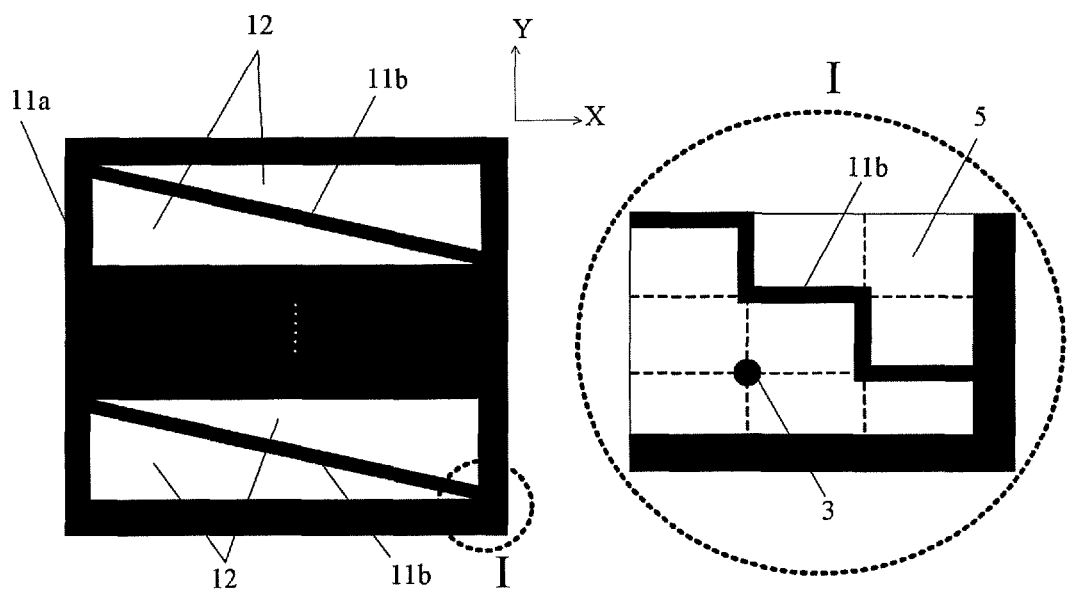
FIGS. 4a-4b are schematic views illustrating pattern designs for the touch control electrode and the black matrix according to an embodiment of the present invention.

The present invention firstly provides a touch control display panel. The touch control display panel comprises an array substrate and an alignment substrate arranged in alignment with the array substrate. As shown in FIG. 3 and FIGS. 4a-4b, the alignment substrate comprises a black matrix 11 arranged on a first substrate 10. The black matrix 11 protrudes from the first substrate 10, and the orthographic projection of a side of the black matrix 11 away from the first substrate 10 on the first substrate covers the orthographic projection of a side of the black matrix 11 close to the first substrate 10 on the first substrate. The first substrate 10 is further provided with a plurality of touch control electrode groups formed using the black matrix as a mask plate. Each of the touch control electrode groups comprises multiple touch control electrodes 12. Adjacent touch control electrode groups, and the multiple touch control electrodes 12 in each touch control electrode group are all separated by the black matrix 11.

The present invention integrates the touch control electrodes 12 that realize touch function into the interior of the touch control display panel, and employs the black matrix 11 as the mask plate at the time of manufacturing the touch control electrodes 12 such that the touch control electrode material is broken off at the black matrix 11 to form the touch control electrodes 12 with a predetermined pattern. The present invention can not only reduce the number of mask plates and the process steps as well as the cost, but also reduce the thickness of the touch control display panel, which facilitates the manufacture of light and thin products and improves the additional value and competitive power of the products.

In some exemplary embodiments, the area of the orthographic projection of a side of the black matrix 11 away from the first substrate 10 on the first substrate is larger than the area of the orthographic projection of a side of the black matrix 11 close to the first substrate 10 on the first substrate. Namely, in the sectional view shown in FIG. 3, two ends of the side of the black matrix 11 away from the first substrate 10 both go beyond two ends of the side of the black matrix 11 close to the first substrate 10 to form a shape similar to an "inverted groove" or "inverted trapezoid body", which facilitates the deposited material of touch control electrode to break off automatically at this position, thereby improving the production efficiency.

The specific shape of the black matrix 11 is not limited in the present invention. For example, the section of the black matrix 11 in the direction perpendicular to the first substrate can be of a trapezoid shape. As shown in FIG. 3, the shorter bottom side of the trapezoid is close to the first substrate 10. Here, setting the section of the black matrix 11 as a trapezoid can effectively simplify the structure for manufacturing the mask plate of the black matrix, thereby reducing the difficulty in production.

Figure 5:
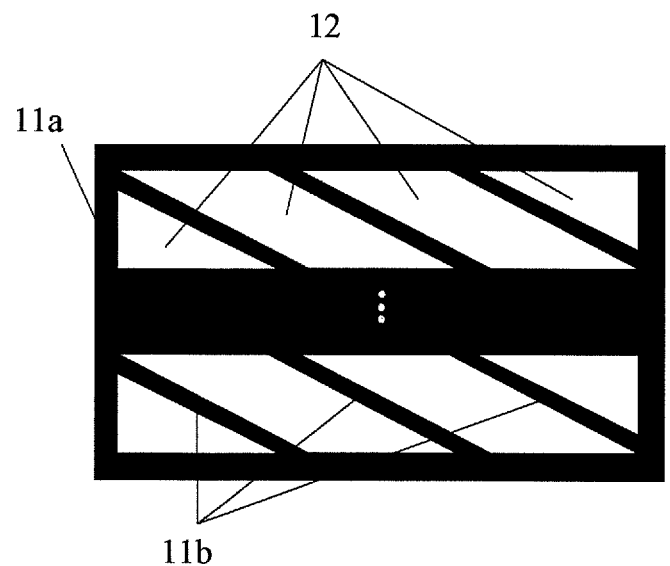
FIG. 5 is a schematic view illustrating pattern designs for the touch control electrode and the black matrix according to another embodiment of the present invention.

FIGS. 4a-4b and FIG. 5 are two implementations of the present invention, respectively. What are illustrated in the figures are top views of the alignment substrate where the black matrix 11 and the touch control electrodes 12 have been manufactured. FIGS. 4a-4b show the single-touch situation in which a plurality of touch control electrode groups are arranged in a column and each of the touch control electrode groups comprises two touch control electrodes 12. FIG. 5 shows the multi-touch situation in which a plurality of touch control electrode groups are arranged in a column and each of the touch control electrode groups comprises multiple (more than two) touch control electrodes 12.

In the present invention, the black matrix 11 comprises a surrounding portion 11a arranged to surround the touch control electrode group and a separating portion 11b for separating the multiple touch control electrodes 12 in the touch control electrode group. The respective touch control electrodes 12 are all connected to a detection circuit for determining information about coordinates in the area covered by them. When a finger touches a certain point, the capacitances between adjacent touch control electrodes 12 and between adjacent touch control electrode groups would change. By detecting the positions where the capacitances change, the coordinates of the touch point can be determined.

The specific detection manner is as follows: taking one touch control electrode group in FIG. 4a as an example, the touch control electrode group comprises two triangular touch control electrodes 12 arranged opposite to each other, the outer contours of the two touch control electrodes 12 are rectangles, a plurality of detection lines are led out from the left side and the lower side of the touch control electrode 12 on the left side, and a plurality of detection lines are also led out from the right side and the upper side of the touch control electrode 12 on the right side. When a finger touches a certain point in the touch control electrode group, the capacitance between the left and right touch control electrodes 12 between the X and Y directions would change relatively, which causes change in the voltage detected by the surrounding detection lines. By analyzing the coordinates where the detection lines detect the change, the coordinates of the touch point can be determined.

In some exemplary embodiments, as shown in FIG. 4b, the separating portion 11b extends in a stepped shape along the edges of pixel units 5 of the touch control display panel, that is, the separating portion 11b corresponds to the positions of the data lines or gate lines on the array substrate so as to avoid impact on the display effect.

It is to be noted that the "stepped shape" here does not indicate the difference in height, but indicates that the separating portion 11b consists of a plurality of black matrix segments connected successively within the plane where the black matrix 11 is located, forming a step-like shape.

It is to be noted that the shape of the touch control electrodes shown in FIGS. 4a and 4b is only illustrative. The touch control electrodes may also have other shapes as required.

The array substrate in the present invention includes a liquid crystal display array substrate, an organic light emitting diode array substrate, and an electroluminescent array substrate based on monocrystalline silicon or polysilicon. In certain embodiments, in order to reduce the alignment deviation, the color filter layer is, manufactured on the array substrate in the present invention. As shown in FIG. 3, the array substrate comprises a thin film transistor array 21 and a color filter layer 22 arranged successively on a second substrate 20.

Further, a spacer 3 is further arranged between the array substrate and the alignment substrate. The spacer 3 and the black matrix 11 are formed simultaneously using the same process and both employ a black resin material. Furthermore, the alignment substrate is further provided with an alignment marker (not shown). The alignment marker and the spacer 3 as well as the black matrix 11 are formed simultaneously using the same process and all employ a black resin material. The black resin material includes an organic resin containing carbon particles or an organic resin containing red, green and blue resins.

That is to say, the black matrix 11, the spacer 3 and the alignment marker on the alignment substrate in the present invention can be formed simultaneously by exposure using the same mask plate, thereby reducing the number of mask plates used during the manufacturing process and reducing the cost.

The present invention further provides a display device comprising the above touch control display panel provided by the present invention. As stated above, the display device has advantages including simple manufacture procedure, low cost and producing light and thin products.

Figure 6:
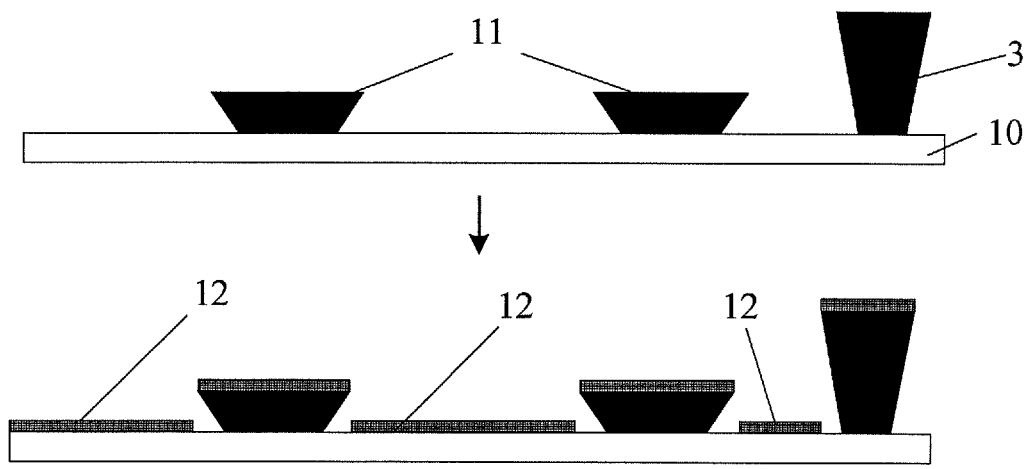
FIG. 6 is a schematic view illustrating the process of manufacturing the alignment substrate in embodiments of the present invention.

The present invention further provides a manufacturing method of a touch control display panel. The touch control display panel comprises an array substrate and an alignment substrate arranged in alignment with the array substrate. As shown in FIG. 6, the manufacturing method comprises:

manufacturing an alignment substrate, comprising:

providing a first substrate 10;

forming a black matrix 11 on the first substrate 10, the black matrix 11 protruding from the first substrate 10, and the orthographic projection of a side of the black matrix 11 away from the first substrate 10 on the first substrate covering the orthographic projection of a side of the black matrix 11 close to the first substrate 10 on the first substrate;

on the substrate where the above steps have been carried out, depositing a touch control electrode layer using the black matrix 11 as a mask plate, the touch control electrode layer being broken off at the positions corresponding to the black matrix to form a plurality of touch control electrode groups (referring to FIGS. 4a-4b and FIG. 5), wherein adjacent touch control electrode groups, and the multiple touch control electrodes 12 in each of the touch control electrode groups are all separated by the black matrix 11.

It is to be noted that electrode materials are also inevitably deposited above the black matrix 11 and the spacer 3 during the above manufacturing process, but these electrode materials do not have any functional effect and would not have impact on the manufacturing process, either, and thus do not need to be processed in order to reduce procedures.

The present invention integrates the touch control electrodes 12 into the interior of the touch control display panel and employs the black matrix 11 as the mask plate at the time of manufacturing the touch control electrodes 12. It can not only reduce the number of mask plates and the process steps as well as the cost, but also reduce the thickness of the touch control display panel, which facilitates the manufacture of light and thin products and improves the additional value and competitive power of the products.

As stated above, in certain embodiments, the area of the orthographic projection of a side of the black matrix 11 away from the first substrate 10 on the first substrate is, larger than the area of the orthographic projection of a side of the black matrix 11 close to the first substrate 10 on the first substrate. In the sectional view shown in FIG. 6, two ends of the side of the black matrix 11 away from the first substrate 10 both go beyond two ends of the side of the black matrix 11 close to the first substrate 10 to form a structure similar to an "inverted groove", which facilitates the deposited touch control electrode material to break off automatically at this position, thereby improving the production efficiency. In certain embodiments, the section of the black matrix 11 in the direction perpendicular to the first substrate is of a trapezoid shape so as to simplify the structure for manufacturing the mask plate of the black matrix, thereby reducing the difficulty in production.

Figure 7:
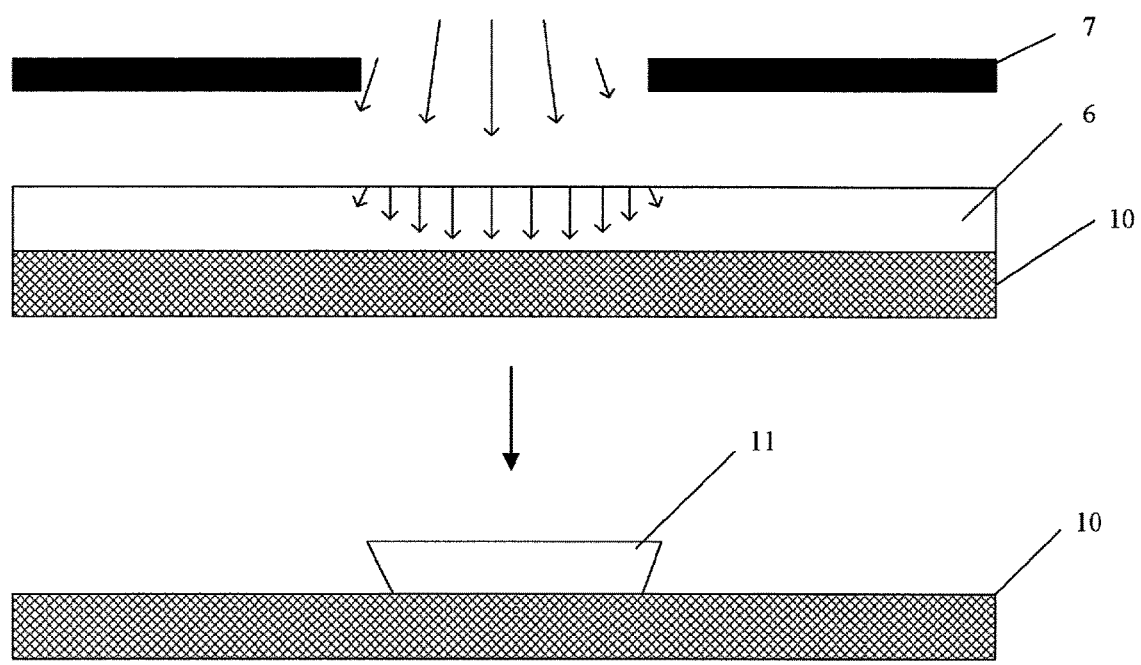
FIG. 7 is a schematic view illustrating the process of manufacturing the black matrix in embodiments of the present invention.

FIG. 7 is a schematic view illustrating the process of manufacturing a black matrix 11. The step of forming a black matrix 11 comprises:

forming a black resin material layer 6 on the first substrate 10;

exposing the black resin material layer 6 using a halftone mask plate 7, drying and developing it after exposure to form a black matrix 11.

The black resin material layer 6 here is manufactured by a negative black resin material. Upon exposure, due to the diffraction effect of light, the transmittances of the mask plate 7 corresponding to the edge positions of the black matrix 11 are smaller than the transmittance at the middle position, and then the black matrix 11 whose section is a trapezoid can be obtained by drying and development after exposure.

Further, the manufacturing method further comprises:

manufacturing an array substrate, referring to FIG. 3, the step comprising:

providing a second substrate 20;

forming, on the second substrate 20, a thin film transistor array 21 and a color filter layer 22 successively, wherein the thin film transistor array 21 comprises a gate layer, a gate insulating layer, an active layer, a source/drain layer, etc. formed successively on the second substrate 20.

Thereafter, the array substrate is aligned with the alignment substrate to obtain the touch control display panel. Moreover, the touch control display panel has advantages including simple manufacture procedure, low cost and lightness and thinness.

Furthermore, the manufacturing method further comprises:

forming a spacer 3 on the first substrate 10, forming the spacer 3 simultaneously using the step of forming the black matrix 11.

Further, the manufacturing method further comprises:

forming an alignment marker (not shown) on the first substrate 10, forming the alignment marker simultaneously using the step of forming the black matrix 11.

The method of the present invention can effectively reduce the number of mask plates used during the manufacturing process, thereby reducing the production cost.

It can be understood that the above embodiments are exemplary embodiments used only for illustrating the principle of the present invention, and that the present invention is not so limited. Various variations and improvements may be made by those ordinarily skilled in the art without departing from the spirit and essence of the present invention. These variations and improvements are regarded as falling within the scope of the present invention. The wording "comprising" does not exclude other elements or steps not listed in the claims. The wording "a" or "an" preceding an element does not exclude a plurality of such elements. The mere fact that certain measures are recited in mutually different dependent claims does not indicate that a combination of these measures cannot be used to advantage.

The invention claimed is:

1. A touch control display panel comprising:
an array substrate and a alignment substrate arranged in alignment with the array substrate, the alignment substrate comprising a black matrix arranged on a first substrate, wherein
the black matrix protrudes from the first substrate, and
an orthographic projection of a side of the black matrix away from the first substrate on the first substrate covers an orthographic projection of a side of the black matrix close to the first substrate on the first substrate,
wherein the first substrate is further provided with a plurality of touch control electrode groups formed by deposition using the black matrix as a mask plate, and
each of the touch control electrode groups comprises two or more touch control electrodes.

2. The touch control display panel according to claim 1, wherein an area of an orthographic projection of a side of the black matrix away from the first substrate on the first substrate is larger than an area of an orthographic projection of a side of the black matrix close to the first substrate on the first substrate.

3. The touch control display panel according to claim 2, wherein a section of the black matrix in a direction perpendicular to the first substrate is of a trapezoid shape, and the shorter bottom side of the trapezoid is close to the first substrate.

4. The touch control display panel according to claim 1, wherein adjacent touch control electrode groups and multiple touch control electrodes in each of the touch control electrode groups are all separated by the black matrix.

5. The touch control display panel according to claim 4, wherein the black matrix comprises a surrounding portion arranged to surround the touch control electrode groups, and a separating portion for separating the multiple touch control electrodes in the touch control electrode groups.

6. The touch control display panel according to claim 5, wherein the separating portion extends in a stepped shape along edges of pixel units of the touch control display panel.

7. The touch control display panel according to claim 1, wherein the array substrate comprises a thin film transistor array and a color filter layer arranged successively on a second substrate.

8. The touch control display panel according to claim 1, wherein a spacer is further provided between the array substrate and the alignment substrate, the spacer and the black matrix being formed simultaneously using the same process.

9. The touch control display panel according to claim 8, wherein the alignment substrate is further provided with an alignment marker, the alignment marker, the spacer and the black matrix being formed simultaneously using the same process.

10. A display device, comprising the touch control display panel according to claim 1.

11. A display device, comprising the touch control display panel according to claim 2.

12. A display device, comprising the touch control display panel according to claim 3.

13. A display device, comprising the touch control display panel according to claim 4.

14. A manufacturing method of a touch control display panel, the touch control display panel comprising an array substrate and an alignment substrate arranged in alignment with the array substrate, wherein the manufacturing method comprises:
- manufacturing an alignment substrate, comprising:
- providing a first substrate;
- forming a black matrix on the first substrate, the black matrix protruding from the first substrate, an orthographic projection of a side of the black matrix away from the first substrate on the first substrate covering an orthographic projection of a side of the black matrix close to the first substrate on the first substrate;
- on the substrate where the above steps have been carried out, depositing a touch control electrode layer using the black matrix as a mask plate, the touch control electrode layer being broken off at positions corresponding to the black matrix to form a plurality of touch control electrode groups, each touch control electrode group comprising multiple touch control electrodes.

15. The manufacturing method according to claim 14, wherein an area of an orthographic projection of a side of the black matrix away from the first substrate on the first substrate is larger than an area of an orthographic projection of a side of the black matrix close to the first substrate on the first substrate.

16. The manufacturing method according to claim 14, wherein a section of the black matrix in a direction perpendicular to the first substrate is of a trapezoid shape, the shorter bottom side of the trapezoid is close to the first substrate.

17. The manufacturing method according to claim 14, wherein the step of forming a black matrix comprises:
- forming a black resin material layer on the first substrate;
- exposing, drying and developing the black resin material layer using a halftone mask plate to form the black matrix.

18. The manufacturing method according to claim 14, wherein the manufacturing method further comprises:
- manufacturing an array substrate, comprising:
- providing a second substrate;
- forming on the second substrate a thin film transistor array and a color filter layer successively;
- performing alignment between the array substrate and the alignment substrate to obtain the touch control display panel.

19. The manufacturing method according to claim 14, wherein the manufacturing method further comprises:
- forming a spacer on the first substrate, wherein the spacer is formed simultaneously using the step of forming the black matrix.

20. The manufacturing method according to claim 19, wherein the manufacturing method further comprises:
- forming an alignment marker on the first substrate, wherein the alignment marker is formed simultaneously using the step of forming the black matrix.

* * * * *